UNITED STATES PATENT OFFICE.

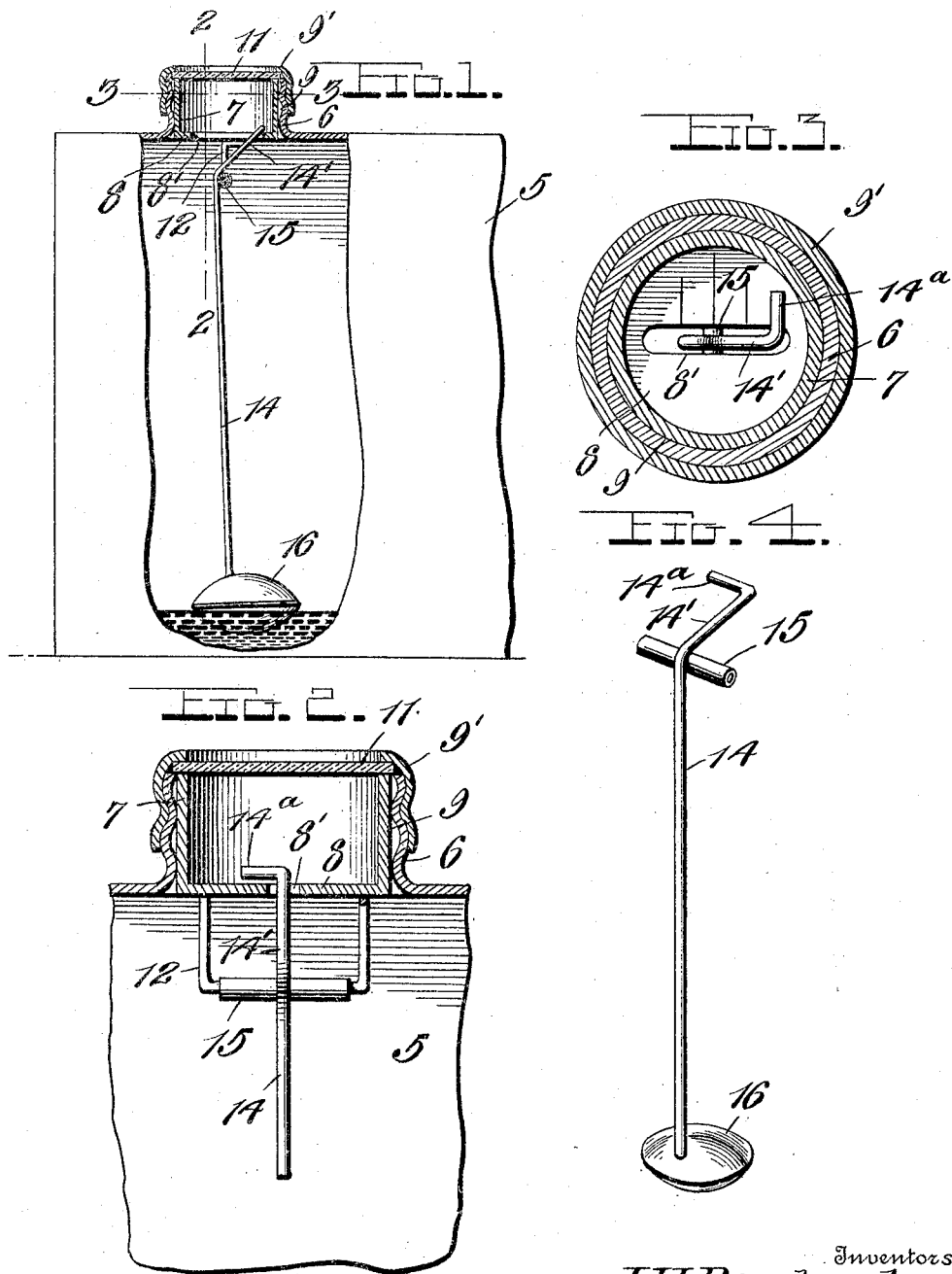

JAMES H. BIRCHARD AND WILLIAM REXINE, OF KENOSHA, WISCONSIN.

FLUID-GAGE.

1,002,557.   Specification of Letters Patent.   Patented Sept. 5, 1911.

Application filed October 3, 1910. Serial No. 585,122.

*To all whom it may concern:*

Be it known that we, JAMES H. BIRCHARD and WILLIAM REXINE, citizens of the United States, residing at Kenosha, in the county of Kenosha and State of Wisconsin, have invented certain new and useful Improvements in Fluid-Gages, of which the following is a specification, reference being had to the accompanying drawings.

This invention relates to an improved fluid gage and has for its object to provide a very simple and reliable gage which is particularly designed for use upon oil tanks for motor vehicles.

Another object of the invention resides in the provision of a dial plate adapted to be arranged within the flange of an opening in the top of the tank, said plate having an indicator rod pivotally mounted beneath the same provided with an index extending through a slot in the plate, and a cap threaded upon said flange having a transparent plate therein whereby the gage may be easily read and the level of the water in the tank ascertained with approximate accuracy.

A further object of the invention is to provide a pivotally mounted indicator rod having an index movable over a graduated plate said rod being eccentrically connected at its lower end to a float whereby the fluid pressure upon the float effects the upward swinging movement of the indicator rod.

With these and other objects in view, the invention consists of the novel features of construction, combination and arrangement of parts hereinafter fully described and claimed, and illustrated in the accompanying drawings, in which—

Figure 1 is a vertical section through an oil tank or reservoir having our improved gage applied thereto; parts being shown in elevation. Fig. 2 is a section taken on the line 2—2 of Fig. 1; Fig. 3 is a section taken on the line 3—3 of Fig. 1; and Fig. 4 is a detail perspective view of the indicator rod and float.

Referring more particularly to the drawing 5 designates a tank or other storage vessel adapted to contain oil or other fluid. The top of this tank is provided with an opening having an annular screw threaded flange 6. Within this flange a cylindrical member 7 is adapted to be inserted, the bottom of said member providing a dial plate 8. The outer annular wall 9 of the member 7 is engaged closely upon the inner surface of the flange 6 to prevent the member 7 being accidentally pushed through the opening and into the tank. A cap 9' is provided with screw threads for engagement upon the threads of the flange 6 and in the upper end of this cap a glass plate 11 is secured whereby the dial plate may be easily seen and the gage accurately read.

A depending U-shaped bearing rod 12 has its ends secured to the bottom of the dial plate 8 and is disposed at right angles with relation to a slot 8' which is provided in said dial plate through which the upper end of the indicator rod 14 extends. The upper end of this indicator rod is offset or angularly disposed at 14' obtusely with relation to the main portion of said rod. At the junction of this angular end and the body of the rod a transversely disposed bearing sleeve 15 is secured, said sleeve being mounted upon the intermediate portion of the U-shaped bearing 12. The extremity of the angularly disposed end portion 14' of the indicator rod extends through the slot 8' in the dial plate and is laterally bent as at 14ª and disposed for movement over the surface of said plate. The dial plate is suitably graduated upon one side of the slot 8' to designate the varying height of the liquid contained in the tank or reservoir when read in accordance with the position of the index provided by the laterally disposed extremity of the rod 14.

To the lower end of the rod 14 a float 16 is secured and it will be observed from reference to Fig. 4 that the rod is eccentrically disposed with relation to the float. By thus connecting the float and rod the greater portion of the pressure of the fluid upon the float in its rise is on one side of the longitudinal axis of the indicator rod whereby the float and rod are caused to move upwardly within the tank. From reference to Fig. 1 it will further be noted that when in its normal position the rod 14 is inclined slightly from the vertical plane, the engagement of the upper end of said rod with the end of the slot 8' of the dial plate maintaining the rod in such position. Thus the upward pressure is upon one side of the pivotal point of the indicator so that the movement of the float as the water rises is assured.

From the above it is believed that the operation of the device will be readily understood.

As the tank is filled and the water or other fluid rises therein, the float 16 will also rise to move the indicator rod upon its pivot, the index upon the upper end of said rod being moved across the graduations on the surface of the dial plate 8. When this index is moved to the opposite end of the slot from its normal position, it will indicate that the tank is full and as the liquid is drawn off from the tank the float will gradually lower therein and move the index to the other end of the slot at which point it will indicate that the tank is empty. The user may therefore readily determine at any time the approximate level of liquid within the tank so that the same may be refilled before it becomes entirely empty.

From the foregoing it will be seen that we have devised a very novel, simple and efficient gage for liquid containers and one which is particularly adapted for use upon oil supply tanks of that character carried by automobiles or other motor vehicles where a gage of simple construction and of a reliable character is particularly desired.

The device may be readily manufactured at a nominal cost and is extremely durable in practical use.

While we have shown and described the preferred construction and arrangement of the various parts, it will be understood that the device is susceptible of considerable modification without departing from the essential feature or sacrificing any of the advantages of our invention.

Having thus described the invention what is claimed is:—

1. The combination with a tank having an opening provided with an annular flange, of a dial member removably disposed within said flange, said member having a plate provided with a slot, and an annular wall for engagement with said flange, a cap threaded on said flange having a transparent plate arranged therein, a support secured to said dial member, an indicating rod pivotally mounted upon said support and having the portion near one of its ends angularly disposed and extended through the slot of said dial member, this end of said rod being laterally disposed to form an index finger movable over the surface of said plate, and a float secured to the other end of said indicating rod and having the greater portion thereof disposed upon one side of the pivotal center of said rod.

2. The combination with a tank having an opening therein and an annular screw threaded flange, of a dial plate arranged within said opening, an annular circumscribing wall on said dial plate having close engagement with the inner surface of said screw-threaded flange, said dial plate being provided with a slot, a cap threaded on the flange having a transparent plate arranged therein, a U-shaped bearing secured to the dial plate and depending therefrom, an indicating rod having the portion near one end disposed at an obtuse angle with respect to the main portion thereof and extended through the slot in said plate, a transverse sleeve secured to said rod at the junction of the angular portion thereof with the main portion, said sleeve being mounted upon said U-shaped bearing, the end of the rod adjacent the angularly disposed portion being laterally disposed to form an index movable over the dial plate, and a float eccentrically secured to the other end of said rod and having its greater portion disposed upon one side of the pivotal point of said rod when in its normal position.

In testimony whereof we hereunto affix our signatures in the presence of two witnesses.

JAMES H. BIRCHARD.
WILLIAM REXINE.

Witnesses:
O. E. CHANEY,
F. C. BENNETT.